(12) United States Patent
Rose et al.

(10) Patent No.: US 6,202,058 B1
(45) Date of Patent: Mar. 13, 2001

(54) SYSTEM FOR RANKING THE RELEVANCE OF INFORMATION OBJECTS ACCESSED BY COMPUTER USERS

(75) Inventors: Daniel E. Rose, Cupertino; Jeremy J. Bornstein, Redwood City; Kevin Tiene, Cupertino; Dulce B. Ponceleón, Palo Alto, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 08/231,655

(22) Filed: Apr. 25, 1994

(51) Int. Cl.[7] .................................................. G06F 15/16

(52) U.S. Cl. ............................................................ 706/45

(58) Field of Search ............................ 395/10, 23, 650; 695/200; 364/401; 706/45, 25

(56) References Cited

U.S. PATENT DOCUMENTS

| | | | | |
|---|---|---|---|---|
| 4,775,935 | * | 10/1988 | Yourick ................................. | 364/401 |
| 5,321,833 | * | 6/1994 | Chang et al. ......................... | 395/600 |
| 5,333,266 | * | 7/1994 | Boaz et al. ........................... | 395/200 |
| 5,377,354 | * | 12/1994 | Scannell et al. ..................... | 395/650 |

OTHER PUBLICATIONS

Graphical Knowledge based electronic mail system by Kantardzic, M. et al., IEEE conference paper. pp. 1165–1168, May 24, 1919.*

Evolving agents for personalized information filtering by Sheth B. et al. IEEE conference paper. pp. 345–352, Mar. 5, 1993.*

A wide area network information filter by Wyle M. F. IEEE conference paper. pp. 10–15, Oct. 11, 1991.*

Replication in an information filtering system by Terry D. B. IEEE conference paper. pp. 66–67, Nov. 13, 1992.*

Visual tools for information retrieval by Spoerri A. IEEE conference paper. pp. 160–168, Aug. 27, 1993.*

Using collaborative filtering to weave an information tapestry by Goldberg David et al. Communications of the ACM, pp. 61–70, Dec. 1991.*

Scsior: Extracting information from online news by Jacobs P.S. et al. Communications of the association for computing machinery, pp. 88–97, Mar. 5, 1993.*

M. Rothman, "A New Music Retailing Technology Says, 'Listen Here'", *The New York Times*, Sunday, Jul. 4, 1993, pp. F8–9.

(List continued on next page.)

*Primary Examiner*—Hosain T. Alam
*Assistant Examiner*—Sanjiv Shah
(74) *Attorney, Agent, or Firm*—Burns, Doane, Swecker & Mathis, L.L.P.

(57) ABSTRACT

Information presented to a user via an information access system is ranked according to a prediction of the likely degree of relevance to the user's interests. A profile of interests is stored for each user having access to the system. Items of information to be presented to a user are ranked according to their likely degree of relevance to that user and displayed in order of ranking. The prediction of relevance is carried out by combining data pertaining to the content of each item of information with other data regarding correlations of interests between users. A value indicative of the content of a document can be added to another value which defines user correlation, to produce a ranking score for a document. Alternatively, multiple regression analysis or evolutionary programming can be carried out with respect to various factors pertaining to document content and user correlation, to generate a prediction of relevance. The user correlation data is obtained from feedback information provided by users when they retrieve items of information. Preferably, the user provides an indication of interest in each document which he or she retrieves from the system.

30 Claims, 4 Drawing Sheets

OTHER PUBLICATIONS

J. Karlgren, "Using Reader Data as a Basis for Measuring Document Proximity", *An Algebra for Recommendations*, pp. 1–9.

R.K. Belew, "Adaptive Information Retrieval: Using a connectionist representation to retrieve and learn about documents", *12th Int'l. Conference on Research & Development in IR*, Jun. 1989.

T.W. Malone et al, "The Information Lens: An Intelligent System for Information sharing in Organizations", *CHI '86 Proceedings*, Apr. 1986, pp. 1–8.

G. Fischer et al, "Information Access in Complex, Poorly Structured Information Spaces", *CHI '91 Proceedings*, Apr.–May, 1991.

B. Sheth et al, "Evolving Agents for Personalized Information Filtering", *Proceedings of the Ninth IEEE Conference on Artificial Intelligence for Applications, CAIA '93*, Orlando, Florida, Mar. '93.

"Announcement of Bellcore Video Rating System".

Goldberg, David et al, "Using Collaborative Filtering to Weave an Information Tapestry", *Communications of the ACM*, Dec. 1991, vol. 35, No. 12., pp. 61–70.

Jennings, Andrew et al, "A Personal News Service Based on a User Model Neural Network", *IEICE Transactions on Information and Systems*, Mar. 1992, No. 2, pp. 198–209.

Stanfill, Craig, "Massively Parallel Information Retrieval for Wide Area Information Servers", *IEEE*, Aug. 1991, pp. 679–682.

* cited by examiner

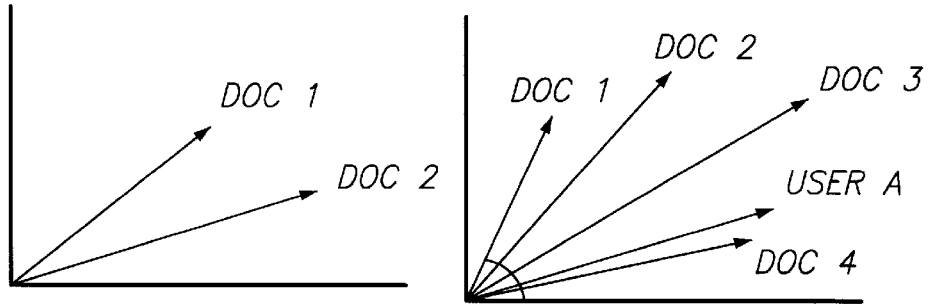
FIG. 5A
FIG. 5B
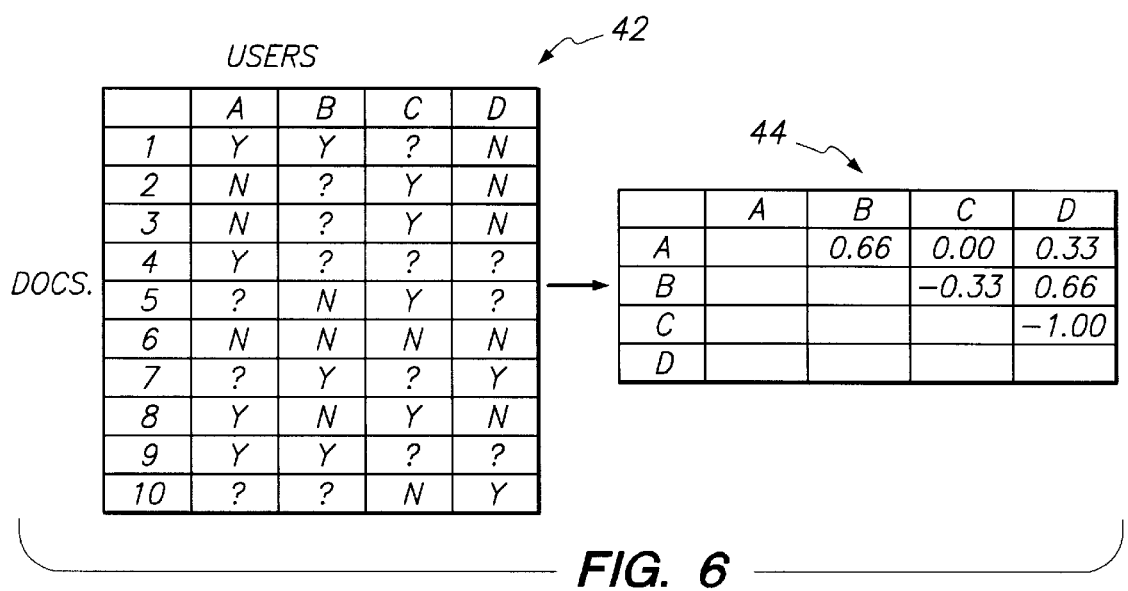
FIG. 6

| Your Messages from "Movie Recommendation" ||
|---|---|
| Score | Title |
| ▭▥▭ | Jagged Edge |
| ▭▥▭ | Sea of Love |
| ▭▥▭ | D.O.A. |
| ▭▥▭ | The Eye of the Needle |
| ▭▥▭ | Dave |
| ▭▥▭ | Sleepless in Seattle |
| ▭▥▭ | Lost in America |
| ▭▥▭ | Mephisto |
| ▭▥▭ | Melvin and Howard |
| ▭▥▭ | Heat and Dust |
| ▭▥▭ | One Against the Wind |
| ▭▥▭ | Flashdance |
| ▭▥▭ | Duel |
| ▭▭▭ | In the Line of Fire |
| ▭▭▭ | Boxing Helena |
| ▭▭▭ | Indecent Proposal |
| ▭▥▭ | A River Runs Through It |
| ▭▥▭ | Cliffhanger |
| ▭▥▭ | Joe Versus the Volcano |
| ▭▥▭ | Not Without My Daughter |
| ▭▥▭ | Fat Man and Little Boy |
| ▭▥▭ | Runaway Train |
| ▭▥▭ | Ordeal by Innocence |
| ▭▥▭ | Cujo |
| ▭▥▭ | THX 1138 |
| ▭▥▭ | The River |
| ▭▥▭ | Black Rain |

*FIG. 7*

SYSTEM FOR RANKING THE RELEVANCE OF INFORMATION OBJECTS ACCESSED BY COMPUTER USERS

FIELD OF THE INVENTION

The present invention is directed to information access in multiuser computer systems, and more particularly to a system for ranking the relevance of information that is accessed via a computer.

BACKGROUND OF THE INVENTION

The use of computers to obtain and/or exchange information is becoming quite widespread. Currently, there are three prevalent types of systems that can be employed to distribute information via computers. One of these systems comprises electronic mail, also known as e-mail, in which a user receives messages, such as documents, that have been specifically sent to his or her electronic mailbox. Typically, to receive the documents, no explicit action is required on the user's part, except to access the mailbox itself. In most systems, the user is informed whenever new messages have been sent to his or her mailbox, enabling them to be read in a timely fashion.

Another medium that is used to distribute information is an electronic bulletin board system. In such a system, users can post documents or files to directories corresponding to specific topics, where they can be viewed by other users who need not be explicitly designated. In order to view the documents, the other users must actively select and open the directories containing topics of interest. Articles and other items of information posted to bulletin board systems typically expire after some time period, and are then deleted.

The third form of information exchange is by means of text retrieval from static data bases, which are typically accessed through dial-up services. A group of users, or a service bureau, can place documents of common interest on a file server. Using a text searching tool, individual users can locate documents matching a specific topical query. Some services of this type enable users to search personal databases, as well as databases of other users.

As the use of these types of systems becomes ever more common, the amount of information presented to users can reach the point of becoming unmanageable. For example, users of electronic mail services are increasingly finding that they receive more mail than they can usefully handle. Part of this problem is due to the fact that junk mail of no particular interest is regularly sent in bulk to lists of user accounts. In order to view messages of interest, the user may be required to sift through a large volume of undesirable mail.

Similarly, in bulletin board systems, the number of documents in a particular topical category at any given time can be quite significant. The user must try to identify documents of interest on the basis of cryptic titles. As a result, an opportunity to view documents that are critically relevant may be missed if the user cannot take the time to view all documents in the category.

Along similar lines, in a text retrieval system, a broadly framed query can result in the identification of a large number of documents for the user to view. In an effort to reduce the number of documents, the user may modify the query to narrow its scope. In doing so, however, documents of interest may be eliminated because they do not exactly match the modified query.

In the past, some information access systems, particularly e-mail systems, have provided the user with the ability to have incoming information filtered, so that only items of interest would be presented to the user. The filtering was carried out on the basis of objective criteria specified by the user. Any messages not meeting the filtering criteria would be blocked. There is always the danger in such an objective approach that potentially relevant items of information can be missed. It is desirable, therefore, to employ a system for predicting the likely relevance of items of information to a particular user, so that the items of interest can be ranked and the need to deal with large amounts of irrelevant information can be avoided.

Some types of relevance predictors have already been proposed. For example, the contents of a document can be examined to make a determination as to whether a user might find that document to be of interest, based on user-supplied information. While approaches of this type have some utility, they are limited because the prediction of relevance is made only on the basis of one attribute, e.g., word content. It is desirable to improve upon existing relevance predicting techniques, and provide a system which takes into account a variety of attributes that are relevant to a user's likely interest in a particular item of information. In this regard, it is particularly desirable to provide an information relevance predicting technique which utilizes community feedback as one of the factors in the prediction.

SUMMARY OF THE INVENTION

In accordance with the present invention, information to be presented to a user via an information access system is ranked according to a prediction of the likely degree of relevance to the user's interests. A profile of interests is stored for each user having access to the system. Using this profile, items of information to be presented to the user, e.g., messages in an electronic mail network or documents within a particular bulletin board category, are ranked according to their likely degree of relevance and displayed with an indication of their relative ranking. For example, they can be displayed in order of rank.

The prediction of relevance is carried out by combining data pertaining to one or more attributes of each item of information with other data regarding correlations of interests between users. For example, a value indicative of the content of a document can be added to another value which defines user correlation, to produce a ranking score for a document. Other information evaluation techniques, such as multiple regression analysis or evolutionary programming, can alternatively be employed to evaluate various factors pertaining to document content and user correlation, and thereby generate a prediction of relevance.

The user correlation data is obtained through feedback information provided by users when they retrieve items of information. Preferably, the user provides an indication of interest in each document which he or she retrieves from the system.

The relevance predicting technique of the present invention is applicable to all different types of information access systems. For example, it can be employed to filter messages provided to a user in an electronic mail system and search results obtained through an on-line text retrieval service. Similarly, it can be employed to route relevant documents to users in a bulletin board system.

The foregoing features of the invention, as well as the advantages offered thereby, are explained in greater detail hereinafter with reference to exemplary implementations illustrated in the accompanying drawings.

BRIEF DESCRIPTION OF THE DRAWINGS

FIG. 5A is a graph of content vectors for two documents in a two-term space;

FIG. 5B is a graph of user profile vectors in a two-term space;

FIG. 6 illustrates the generation of a correlation chart; and

FIG. 7 is an example of an interface window for a movie recommendation database.

DETAILED DESCRIPTION

To facilitate an understanding of the principles of the present invention, they are described hereinafter with reference to the implementation of the invention in a system having multiple personal computers that are connected via a network. It will be appreciated, however, that the practical applications of the invention are not limited to this particular environment. Rather, the invention can find utility in any situation which provides for computer access to information. For example, it is equally applicable to other types of multiuser computer systems, such as mainframe and minicomputer systems in which many users can have simultaneous access to the same computer.

The present invention can be employed in various kinds of information access systems, such as electronic mail, bulletin board, text search and others. Depending upon the type of system, a variety of different types of information might be available for access by users. In addition to more conventional types of information that are immediately interpretable by a person, such as text, graphics and sound, for example, the accessible information might also include data and/or software objects, such as scripts, rules, data objects in an object-oriented programming environment, and the like. For ease of understanding, in the following description, the term "message" is employed in a generic manner to refer to each item of information that is provided by and accessible to users, whether or not its contents can be readily comprehended by the person receiving it. A message, therefore, can be a memorandum or note that is addressed from one user of an electronic mail system to another, a textual and/or graphical document, or a video clip. A message can also be a data structure or any other type of accessible information.

Figure 1:
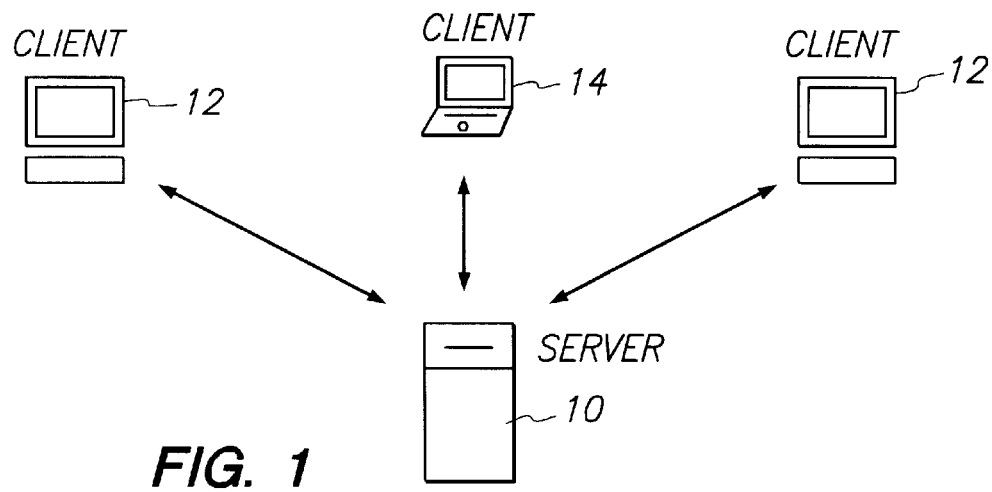
FIG. 1 is a general diagram of the hardware architecture of one type of information access system in which the present invention can be implemented.

One example of a hardware architecture for an information access system implementing the present invention is illustrated in FIG. 1. The specific hardware arrangement does not form part of the invention itself. Rather, it is described herein to facilitate an understanding of the manner in which the features of the invention interact with the other components of an information access system. The illustrated architecture comprises a client-server arrangement, in which a database of information is stored at a server computer 10, and is accessible through various client computers 12, 14. The server 10 can be any suitable micro, mini or mainframe computer having sufficient storage capacity to accommodate all of the items of information to be presented to users. The client computers can be suitable desktop computers 12 or portable computers 14, e.g., notebook computers, having the ability to access the server computer 10. Such access might be provided, for example, via a local area network or over a wide area through the use of modems, telephone lines, and/or wireless communications.

Each client computer is associated with one or more users of the information access system. It includes a suitable communication program that enables the user to access messages stored at the server machine. More particularly, the client program may request the user to provide a password or the like, by means of which the user is identified to the server machine. Once the user has been identified as having authorized access to the system, the client and server machines exchange information through suitable communication protocols.

One particular type of information access system in which the present can be utilized is described in detail hereinafter. It will be appreciated that this description is for exemplary purposes only, and that the practical applications of the invention are not limited to this particular embodiment.

Figure 2:
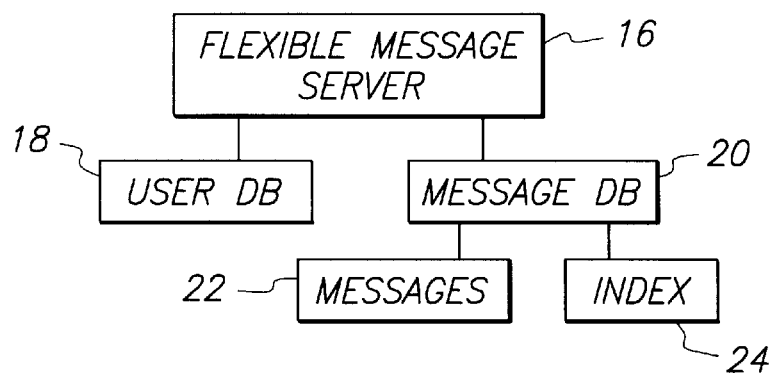
FIG. 2 is a block diagram of an exemplary software architecture for a server program.

The general architecture of a server program for an information access system is illustrated in block diagram form in FIG. 2. Referring thereto, at the highest level the server program contains a message server 16. The message server carries out communications with each of the clients, for example over a network, and retrieves information from two databases, a user database 18 and a message database 20. The user database 18 contains a profile for each of the system's users, as described in greater detail hereinafter. The message database contains stored messages 22 supplied by and to users of the database. In addition, the message database has associated therewith an index 24, which provides a representation of each of the stored messages 22, for example its title. The index can contain other information pertinent to the stored messages as well.

In the operation of the system, when a user desires to retrieve messages, the user accesses the system through the client program on one of the client machines 12, 14. As part of the access procedure, the user may be required to log into the system. Through the use of a password or other appropriate form of identification, the user's identity is provided to the server 10, which acknowledges the user's right to access the system or disconnects the client machine if the user has not been authorized. When the access procedure is successful, the message server 16 on the server machine retrieves the user's profile from the user database 18. This profile is used to rank the messages stored within the system. The particular information within the user's profile is based upon a ranking technique that is described in detail hereinafter. Once the user's profile is retrieved, all of the messages to be provided to the user are ranked on the basis of a predicted degree of relevance to the user. For example, in an e-mail system, all of the messages addressed to that user are ranked. Those messages which are particularly pertinent to the user's interests are highly ranked, whereas junk mail messages are given a low ranking.

Figures 3, 4:
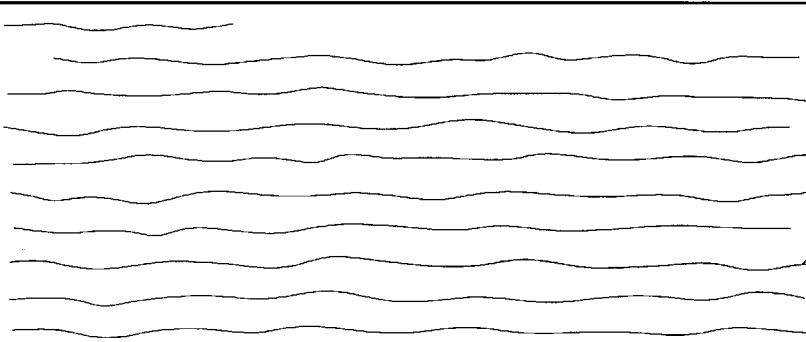
FIG. 3 is an example of an interface window for presenting a sorted list of messages to a user.
FIG. 4 is an example of an interface window for presenting the contents of a message to a user.

A list of the ranked messages is provided to the client program, which displays some number of them through a suitable interface. Preferably, the messages are sorted and displayed in order from the highest to the lowest ranking. One example of such an interface is illustrated in FIG. 3. Referring thereto, the interface comprises a window 26 containing a number of columns of information. The left hand column 28 indicates the relative ranking score of each message, for example in the form of a horizontal thermometer-type bar 30. The remaining columns can contain other types of information that may assist the user in determining whether to retrieve a particular message, such as the date on which the message was posted to the system, the message's author, and the title of the message. The information that is displayed within the window can be stored as part of the index 24. If the number of messages is greater than that which can be displayed in a single window, the window can be provided with a scroll bar 32 to enable the user to scroll through and view all of the message titles.

Other display techniques can be employed in addition to, or in lieu of, sorting the messages in order of rank. For example, the color, size and/or intensity of each displayed message can be varied in accordance with its predicted relevance.

When the user desires to view any particular message, the desired message is selected within the window, using any suitable technique for doing so. Once a message has been selected by the user, the client program informs the server 10 of the selected message. In response thereto, the server retrieves the complete text of the message from the stored file 22, and forwards it to the client, where it is displayed.

An example of an interface for the display of a message is illustrated in FIG. 4. Referring thereto, the message can be displayed in an appropriate window 34. The contents of the message, e.g., its text, is displayed in the main portion of the window. Located above this main portion is header 36 which contains certain information regarding the message. For example, the header can contain the same information as provided in the columns shown in the interface of FIG. 3, i.e., author, date and title. Located to the right of this information are two icons which permit the user to indicate his or her interest in that particular message. If the user found the message to be of interest, a "thumbs-up" icon 38 can be selected. Alternatively, if the message was of little of no interest to the user, a "thumbs-down" icon 40 can be selected. When either of these two icons is selected, the indication provided thereby is forwarded to the server 10, where it is used to update the user profile.

In the example of FIG. 4, the user is provided with only two possible selections for indicating interest, i.e., "thumbs-up" or "thumbs-down", resulting in very coarse granularity for the indication of interest. If desired, finer resolution can be obtained by providing additional options for the user. For example, three options can be provided to enable the user to indicate high interest, mediocre interest, or minimal interest.

Preferably, in order to obtain reliable information about each user, it is desirable to have the user provide an indication of degree of interest for each message which has been retrieved. To this end, the interface provided by the client program can be designed such that the window 34 containing the content of the message, as illustrated in FIG. 4, cannot be closed unless one of the options is selected. More particularly, the window illustrated in FIG. 4 does not include a conventional button or the like for enabling the window to be closed. To accomplish this function, the user is required to select one of the two icons 38 or 40 which indicates his or her degree of interest in the message. When one of the icons is selected, the window is closed and the message disappears from the screen. With this approach, each time a message is retrieved, feedback information regarding the user's degree of interest is obtained, to thereby maintain an up-to-date profile for the user.

Depending upon the particular information access system that is being used, the type of information presented to the user may vary. In the embodiment illustrated in FIGS. 1 and 2, all items of information available to users can be stored in a single database 22. If desired, multiple databases directed to specific categories of information can be provided. For example, a separately accessible database of movie descriptions can be provided, to make movie recommendations to users. Each separate database can have its own profile for users who access that database. Thus, each time a user sees a movie, he or she can record his or her reaction to it, e.g., like or dislike. This information is used to update the user's profile for the movie database, as well as provide information to rank that movie for viewing by other users whose interests in movies are similar or opposed. An example of a user interface for presenting this information is shown in FIG. 7. Referring thereto, it can be seen that the title of each movie is accompanied by a recommendation score 46. This particular example also illustrates a different technique for quantifying the relevance ranking of each item. Specifically, the scores 46 are negative as well as positive. This approach may be more desirable for certain types of information, for example, to provide a clearer indication that the viewer will probably dislike certain movies. The values that are used for the ranking display can be within any arbitrarily chosen range.

Traditionally, the ranking of messages was based only on the content of the messages. In accordance with the present invention, however, the ranking of messages is carried out by combining data based upon an attribute of the message, for example its content, with other data relating to correlations of indications provided by users who have retrieved the message. To derive the content-based data, certain elements of the message, e.g., each word in a document, can be assigned a weight, based on its statistical importance. Thus, for example, words which frequently occur in a particular language are given a low weight value, while those which are rarely used have a high weight value. The weight value for each term is multiplied by the number of times that term occurs in the document. Referring to FIG. 5A, the results of this procedure is a vector of weights, which represents the content of the document.

For non-document types of information, the content data can be based upon other attributes that are relevant to a user's interest in that information. For example, in the movie database, the content vector might take into account the type of movie, such as action or drama, the actors, its viewer category rating, and the like.

The example of FIG. 5A illustrates a two-dimensional vector for each of two documents. In practice, of course, the vectors for information content would likely have hundreds or thousands of dimensions, depending upon the number of terms that are monitored. For further information regarding the computation of vector models for indexing text, reference is made to *Introduction To Modern Information Retrieval* by Gerald Salton and Michael J. McGill (McGraw-Hill 1983), which is incorporated herein by reference.

Each user profile also comprises a vector, based upon the user's indications as to his or her relative interest in previously retrieved documents. Each time a user provides a new response to a retrieved message, the profile vector is modified in accordance with the results of the indication. For example, if the user indicates interest in a document, all of the significant terms in that document can be given increased weight in the user's profile.

Each user in the system will have at least one profile, based upon the feedback information received each time the user accesses the system. If desirable, a single user might have two or more different profiles for different task contexts. For example, a user might have one profile for work-related information and a separate profile for messages pertaining to leisure and hobbies.

One factor in the prediction of a user's likely interest in a particular piece of information can be based on the similarity between the document's vector and the user's profile vector. For example, as shown in FIG. 5B, a score of a document's relevance can be indicated by the cosine of the angle between the document's vector and the user's profile vector. A document having a vector which is close to that of the user's profile will be highly ranked, whereas those which are significantly different will have a lower ranking.

A second factor in the prediction of a user's interest in information is based upon a correlation with the indications provided by other users. Referring to FIG. 6, each time a user retrieves a document and subsequently provides an indication of interest, the result can be stored in a table 42. From this table, a correlation matrix R can be generated, whose entries indicate the degree of correlation between the various users' interests in commonly retrieved messages. More precisely, element $R_{ij}$ contains a measure of correlation between the i-th user and the j-th user. One example of such a matrix is the correlation matrix illustrated at 44 in FIG. 6. In this example, only the relevant entries are shown. That is, the correlation matrix is symmetric, and the diagonal elements do not provide any additional information for ranking purposes.

Subsequently, when a user accesses the system, the feedback table 42 and the correlation matrix 44 are used as another factor in the prediction of the likelihood that the user will be interested in any given document. As one example of an algorithm that can be used for this purpose, a prediction score, $P_{ij}$ for the i-th user regarding the j-th document, can be computed as:

$$P_{ij} = \sum_{k \neq i,j} R_{ik} V_{kj}$$

where $R_{ik}$ is the correlation of users i and k, the $V_{kj}$ is the weight indicating the feedback of user k on document j. Thus, for the corresponding data in FIG. 6, the prediction score for User C regarding Document 1 is as follows:

(0.00\*1)+(−0.33\*1)+(−1.00\*−1)=0.67

In this formula, each parenthetical product pertains to one of the other users, i.e., A, B and D, respectively. Within each product, the first value represents the degree of correlation between the other user and the current user in question, as indicated by the matrix 44. The second value indicates whether the other user voted favorably (+1) or negatively (−1) after reading the document, as indicated in the table 42. The values of +1 and −1 are merely exemplary. Any suitable range of values can be employed to indicate various users' interests in retrieved items of information.

In accordance with the invention, a combination of attribute-based and correlation-based prediction is employed to rank the relevance of each item of information. For example, a weighted sum of scores that are obtained from each of the content and correlation predictors can be used, to determine a final ranking score. Other approaches which take into account both the attribute-based information and user correlation information can be employed. For example, multiple regression analysis can be utilized to combine the various factors. In this approach, regression methods are employed to identify the most important attributes that are used as predictors, e.g., salient terms in a document and users having similar feedback responses, and how much each one should be weighted. Alternatively, principal components analysis can be used to identify underlying aspects of content-based and correlation-based data that predict a score.

As another example, evolutionary programming techniques can be employed to analyze the available data regarding content of messages and user correlations. One type of evolutionary programming that is suitable in this regard is known as genetic programming. In this type of programming, data pertaining to the attributes of messages and user correlation are provided as a set of primitives. The various types of data are combined in different manners and evaluated, until the combination which best fits known results is found. The result of this combination is a program that describes the data which can best be used to predict a given user's likely degree of interest in a message. For further information regarding genetic programming, reference is made to Koza, John R., *Genetic Programming: On The Programming of Computers By Means of Natural Selection*, MIT Press 1992.

In a more specific implementation of evolutionary programming, the analysis technique known as genetic algorithms can be employed. This technique differs from genetic programming by virtue of the fact that pre-defined parameters pertaining to the items of information are employed, rather than more general programming statements. For example, the particular attributes of a message which are to be utilized to define the prediction formula can be established ahead of time, and employed in the algorithms. For further information regarding this technique, reference is made to Goldberg, David E., *Genetic Algorithms in Search, Optimization and Machine Learning*, Addison-Wesley 1989.

In addition to content and correlation scores, other attributes can be employed. For example, event times can be used in the ranking equation, where older items might get lower scores. If a message is a call for submitting papers to a conference, its score might rise as the deadline approached, then fall when it had passed. These various types of data can be combined using any of the data analysis techniques described previously, as well as any other well-known analysis technique.

From the foregoing, it can be seen that the present invention provides a system for ranking information which is not based on only one factor, namely content. Rather, a determination is made on the basis of a combination of factors. In a preferred implementation, the present invention provides for social interaction within the community of users, since each individual can benefit from the experiences of others. A user who has written about a particular topic is more likely to have other messages relating to that same topic presented to him or her, without awareness of the authors of these other items of information.

The invention takes advantage of the fact that a community of users is participating in the presentation of information to users. In current systems, if a large number of readers each believe a message is significant, any given user is no more likely to see it than any other message. Conversely, the originator of a relatively uninteresting idea can easily broadcast it to a large number of people, even though they may have no desire to see it. In the system of the present invention, however, the relevance score of a particular message takes into account not only on the user's own interests, but also feedback from the community.

To facilitate an understanding of the invention, its principles have been explained with reference to specific embodiments thereof. It will be appreciated, however, that the practical applications of the invention are not limited to these particular embodiments. The scope of the invention is set forth in the following claims, rather than the foregoing description, and all equivalents which are consistent with the meaning of the claims are intended to be embraced therein.

What is claimed:

1. In a computerized information access system, a method for presenting items of information to users, comprising the steps of:

a) storing user profiles for users having access to the system, where each user profile is based, at least in part, on the attributes of information the user finds to be of interest;

b) determining an attribute-based relevance factor for an item of information which is indicative of the degree to which an attribute of that item of information matches the profile for a particular user;

c) determining a measure of correlation between the particular user's interests and those of other users who have accessed said item of information;

d) combining said relevance factor and said degree of correlation to produce a ranking score for said item of information;

e) repeating steps b, c and d for each item of information to be presented to said particular user; and f) displaying the items of information to the user in accordance with their ranking scores.

2. The method of claim 1, wherein said combining step comprises a regression analysis of attribute-based and correlation-based factors for each item of information.

3. The method of claim 1 wherein said combining step comprises forming a weighted sum of said relevance factor and said degree of correlation.

4. The method of claim 1, wherein said ranking score is also related to a date associated with each item of information.

5. The method of claim 1 wherein said step of determining said degree of correlation includes the steps of obtaining feedback information from users regarding each user's interest in particular items of information when each such item is accessed by a user, and recording said feedback information.

6. The method of claim 5 further including the step of generating a correlation matrix which indicates the degree of correlation between respective users based upon commonly accessed items of information.

7. The method of claim 1 wherein said attribute is the contents of the item of information.

8. The method of claim 1 wherein said items of information are displayed in order of their relative rankings to thereby provide said indication.

9. The method of claim 1 wherein said relevance factor and said degree of correlation are combined by means of evolutionary programming techniques to generate a formula that is used to produce a ranking score for an item of information.

10. The method of claim 9 wherein said evolutionary programming technique comprises genetic programming.

11. The method of claim 9 wherein said evolutionary programming technique comprises genetic algorithms.

12. The method of claim 1 wherein said information access system is an electronic mail system, and said method is employed to filter messages provided to subscribers of said system.

13. The method of claim 1 wherein said information access system is an electronic bulletin board system, and said method is employed to rank items of information in a topic category selected by a user.

14. A computer-based information access system, comprising:
   a first database containing items of information to be provided to users of said system;
   means for enabling users to indicate their degree of interest in particular items of information stored in said first database;
   means for determining the correlation between the indicated interests of respective users and for storing information related thereto; and
   means for predicting a given user's likely degree of interest in a particular item of information on the basis of said information relating to the determined correlation and at least one attribute of the item of information.

15. The information access system of claim 14 further including a user interface for displaying plural items of information with an indication of their relative predictions regarding likely degree of interest for a given user.

16. The information access system of claim 14 wherein said attribute is the contents of the item of information.

17. The information access system of claim 14 further including a second database containing at least one profile of interests for each of a number of users of said system, and wherein said prediction is based on a combination of (i) the relationship of said attribute to the profile for said given user and (ii) the correlation between indications provided by the given user and other users who have had access to said item of information.

18. The information access system of claim 17 wherein each user profile comprises a vector and said attribute defines a vector for the item of information, and wherein said relationship is determined in accordance with the similarities between the vector for the item of information and the user profile vector.

19. The information access system of claim 14 wherein said prediction is based on a regression analysis of data related to said attribute and stored correlation information pertaining to said given user.

20. The information access system of claim 14 wherein said prediction is determined by means of evolutionary programming techniques.

21. The information access system of claim 20 wherein the evolutionary programming techniques produce a formula which establishes a combination of attribute-based and correlation-based factors that determine said prediction.

22. The information access system of claim 20 wherein said evolutionary programming techniques comprise genetic programming.

23. The information access system of claim 20 wherein said evolutionary programming techniques comprise genetic algorithms.

24. The system of claim 14, wherein said information access system comprises an electronic mail system.

25. The system of claim 14, wherein said information access system comprises an electronic bulletin board system.

26. The system of claim 14, wherein said information access system comprises an electronic search and retrieval system.

27. The method of claim 1 wherein the items of information are displayed with an indication of their ranking scores.

28. A method for displaying items of information to users, comprising the steps of:
   determining a relevance factor for an item of information, based upon an attribute of the item of information;
   defining a relationship between the interests of a given user and those of other users;
   determining a correlation factor for the item of information, based upon said defined relationship;
   combining said relevance factor and said correlation factor to produce a ranking score for the item of information; and
   displaying the item of information to the given user in accordance with its ranking score.

29. The method of claim 28 further including the steps of determining a ranking score for multiple items of information, and displaying the items of information in accordance with their ranking scores.

30. The method of claim 28 wherein the item of information is displayed with an indication of its ranking score.

\* \* \* \* \*